United States Patent
Lin et al.

(10) Patent No.: US 11,224,231 B2
(45) Date of Patent: Jan. 18, 2022

(54) METHOD FOR BREWING BEVERAGE, WATER CONCENTRATE FOR BREWING BEVERAGE, AND BEVERAGE THEREOF

(71) Applicant: AQUA LOHAS WATER-TECH SERVICE CO., LTD., Miaoli County (TW)

(72) Inventors: Wei-Chieh Lin, Miaoli County (TW); Tsung-Han Chiang, Miaoli County (TW); Hui-Xiang Zhou, Miaoli County (TW)

(73) Assignee: Aqua Lohas Water-Tech Service Co., Ltd., Hsinchu Science Park (TW)

( * ) Notice: Subject to any disclaimer, the term of this patent is extended or adjusted under 35 U.S.C. 154(b) by 113 days.

(21) Appl. No.: 16/683,905

(22) Filed: Nov. 14, 2019

(65) Prior Publication Data
US 2020/0154728 A1    May 21, 2020

Related U.S. Application Data

(60) Provisional application No. 62/767,642, filed on Nov. 15, 2018.

(51) Int. Cl.
| | | |
|---|---|---|
| *A23F 5/26* | (2006.01) | |
| *A23F 3/18* | (2006.01) | |
| *C02F 1/68* | (2006.01) | |

(52) U.S. Cl.
CPC ............... *A23F 5/267* (2013.01); *A23F 3/18* (2013.01); *C02F 1/68* (2013.01)

(58) Field of Classification Search
CPC .............. A23F 5/267; A23F 3/18; C02F 1/68
See application file for complete search history.

(56) References Cited

U.S. PATENT DOCUMENTS

| | | | | |
|---|---|---|---|---|
| 5,792,502 | A * | 8/1998 | Montezinos | A23F 3/163 |
| | | | | 426/573 |
| 6,268,003 | B1 * | 7/2001 | Calderas | A23F 3/163 |
| | | | | 426/271 |
| 2003/0138384 | A1 * | 7/2003 | Stephenson | A23L 2/38 |
| | | | | 424/49 |
| 2012/0244254 | A1 | 9/2012 | Takahashi et al. | |
| 2016/0235801 | A1 * | 8/2016 | Thomas | A23L 2/52 |
| 2017/0143155 | A1 | 5/2017 | Lin | |
| 2018/0352998 | A1 * | 12/2018 | Bissen | A23F 5/262 |
| 2019/0231738 | A1 | 8/2019 | Bell | |
| 2019/0307283 | A1 | 10/2019 | Avins et al. | |

FOREIGN PATENT DOCUMENTS

| | | | |
|---|---|---|---|
| KR | 20150141009 | * | 12/2015 |
| TW | 201228944 | * | 7/2012 |
| WO | WO2007100599 | * | 9/2007 |

OTHER PUBLICATIONS

Translation for TW201228944 published Jul. 2012.*
Translation for KR20150141009 published Dec. 2015.*

* cited by examiner

*Primary Examiner* — Anthony J Weier

(74) *Attorney, Agent, or Firm* — Muncy, Geissler, Olds & Lowe, P.C.

(57) ABSTRACT

A method for brewing a beverage, a water concentrate for brewing the beverage and the beverage thereof are provided, wherein the water concentrate includes a hardness between 10,000 ppm and 100,000 ppm, a calcium ion concentration between 300 ppm and 10,000 ppm, a magnesium ion concentration between 200 ppm and 20,000 ppm, a sodium ion concentration between 30 ppm and 1,000 ppm, a potassium ion concentration between 30 ppm and 1,000 ppm, a bicarbonate ion between 10 ppm and 300 ppm, and a pH between 6 and 9. By controlling the hardness and mineral composition of the water concentrate, the invention increases the affinity to amino acids, flavonoid compounds, polyphenolic compounds, terpenoid compounds, alkaloids, and organic acids in coffee or tea beverages, and adds the content of substances which are helpful to the human body in addition to improving the taste and flavor of the beverages.

14 Claims, No Drawings

METHOD FOR BREWING BEVERAGE, WATER CONCENTRATE FOR BREWING BEVERAGE, AND BEVERAGE THEREOF

FIELD OF THE INVENTION

The invention relates to a water concentrate for brewing a beverage and the beverage thereof, in particular to a water composition capable of improving components, taste and flavor of the beverage and the beverage thereof.

BACKGROUND OF THE INVENTION

Water is an important component of all organisms. For example, water accounts for 70% in the human body. It participates not only in biochemical reactions, but also in nutrition and oxygen transportation in the human body, and further contributes a lot to maintaining the temperature of organisms.

In addition to the importance of water, the quality of water taken daily has been increasingly valued by the general public and related manufacturers. Thus, technical research and markets related to drinking water have become increasingly flourishing, for example, filtering certain impurities in the water to improve the taste, or adding additives such as silver ions or minerals to impart antibacterial properties to the drinking water and adjust the taste of the drinking water, etc.

In view of the higher dietary standards of consumers, they not only emphasize the taste of water when drinking pure water, but also has a further demand for the taste of beverages such as tea or coffee. Traditionally, it is mostly believed that the taste of beverages such as tea or coffee depends on raw materials such as tea leaves, coffee beans or powders thereof, or on factors such as brewing temperature, sequence or technique. For example, U.S. Patent Publication No. US 2019/0307283A1 discloses a temperature control for extracted beverages, including coffee, via controlled vacuum, and associated systems and methods, U.S. Patent Publication No. US 2012/0244254A1 discloses a method of processing green coffee beans, U.S. Patent Publication No. US 2019/0231738A1 discloses a method of maximizing epigallocatechin gallate content in tea, and U.S. Patent Publication No. US 2017/0143155A1 discloses a tea drink preparation method. However, few studies have been conducted on brewing water.

SUMMARY OF THE INVENTION

The invention has a main object to provide a water concentrate capable of improving beverage components, taste and flavor.

In order to achieve the object, the invention discloses a water concentrate for brewing a beverage, wherein the water concentrate comprises a hardness in a range from 10,000 ppm to 100,000 ppm, a calcium ion concentration in a range from 300 ppm to 10,000 ppm, a magnesium ion concentration in a range from 200 ppm to 20,000 ppm, a sodium ion concentration in a range from 30 ppm to 1,000 ppm, a potassium ion concentration in a range from 30 ppm to 1,000 ppm, a bicarbonate ion in a range from 10 ppm to 300 ppm, and a pH in a range from 6 to 9.

In order to achieve the object, the invention also discloses a beverage brewed by the water concentrate, wherein the beverage contains at least one component selected from the group consisting of amino acids, flavonoid compounds, polyphenolic compounds, terpenoid compounds, alkaloids, organic acids, and a combination thereof.

The invention further provides a method for brewing a beverage, which comprises the steps of: providing a water concentrate, wherein the water concentrate comprises a hardness in a range from 10,000 ppm to 100,000 ppm, a calcium ion concentration in a range from 300 ppm to 10,000 ppm, a magnesium ion concentration in a range from 200 ppm to 20,000 ppm, a sodium ion concentration in a range from 30 ppm to 1,000 ppm, a potassium ion concentration in a range from 30 ppm to 1,000 ppm, a bicarbonate ion in a range from 10 ppm to 300 ppm, and a pH in a range from 6 to 9; diluting the water concentrate with a water-based diluent to obtain a brewing water, wherein the volume ratio of the water concentrate to the diluent is in a range from 1:500 to 1:1500; and using the brewing water to brew a beverage material.

By controlling the hardness and mineral composition of the water concentrate, the invention can increase the affinity to amino acids, flavonoid compounds, polyphenolic compounds, terpenoid compounds, alkaloids, and organic acids in coffee or tea beverages so as to improve extraction efficiency, and add the content of substances obviously which are helpful to the human body in addition to improving the taste and flavor of the beverages.

BRIEF DESCRIPTION OF THE DRAWINGS

None

DETAILED DESCRIPTION OF THE PREFERRED EMBODIMENTS

The detailed description and technical contents of the present invention are as follows.

The invention relates to a water concentrate for brewing a beverage, wherein the water concentrate satisfies the conditions of having a hardness between 10,000 ppm and 100,000 ppm, a calcium ion concentration between 300 ppm and 10,000 ppm, a magnesium ion concentration between 200 ppm and 20,000 ppm, a sodium ion concentration between 30 ppm and 1,000 ppm, a potassium ion concentration between 30 ppm and 1,000 ppm, a bicarbonate ion between 10 ppm and 300 ppm, and a pH between 6 and 9.

In an embodiment, the beverage brewed by the water concentrate disclosed herein contains at least one component selected from the group consisting of amino acids, flavonoid compounds, polyphenolic compounds, terpenoid compounds, alkaloids, organic acids, and a combination thereof.

In a first embodiment of the present invention, the hardness is between 60,000 ppm and 80,000 ppm, the calcium ion concentration is between 4,000 ppm and 6,000 ppm, the magnesium ion concentration is between 13,000 ppm and 15,000 ppm, the sodium ion concentration is between 400 ppm and 500 ppm, the potassium ion concentration is between 400 ppm and 500 ppm, the bicarbonate ion concentration is between 200 ppm and 250 ppm, and the pH is about 7.3. The first embodiment of the present invention is suitable for brewing coffee.

In a second embodiment of the present invention, the hardness is between 10,000 ppm and 13,000 ppm, the calcium ion concentration is between 1,000 ppm and 1,500 ppm, the magnesium ion concentration is between 2,000 ppm and 2,500 ppm, the sodium ion concentration is between 50 ppm and 100 ppm, the potassium ion concentration is between 50 ppm and 100 ppm, the bicarbonate ion concentration is between 10 ppm and 100 ppm, and the pH is about 7.6. The second embodiment of the present invention is suitable for brewing a tea beverage.

The invention also discloses a method for brewing a beverage, which comprises the steps of:

Step A: providing a water concentrate, wherein the water concentrate satisfies the conditions of having a hardness between 10,000 ppm and 100,000 ppm, a calcium ion concentration between 300 ppm and 10,000 ppm, a magnesium ion concentration between 200 ppm and 20,000 ppm, a sodium ion concentration between 30 ppm and 1,000 ppm, a potassium ion concentration between 30 ppm and 1,000 ppm, a bicarbonate ion between 10 ppm and 300 ppm, and a pH between 6 and 9;

Step B: diluting the water concentrate with a water-based diluent to obtain a brewing water, wherein the volume ratio of the water concentrate to the diluent is between 1:500 and 1:1500; and Step C: using the brewing water to brew a beverage material.

In one embodiment of the present invention, the beverage material contains at least one component selected from the group consisting of amino acids, flavonoid compounds, polyphenolic compounds, terpenoid compounds, alkaloids, organic acids, and a combination thereof.

In one embodiment of the present invention, the water concentrate may be used to brew tea leaves, tea bags, coffee powder, coffee beans, coffee capsules, and the like. The diluent may be reverse osmosis (RO) water, distilled water, ultrapure water, deionized water, or a combination thereof, and the diluent may also be boiled or filtered tap water.

The water concentrate disclosed by the invention can be obtained by refining and concentrating seawater, or can be obtained by chemically adding ordinary water to comprise proper hardness, calcium ion concentration, magnesium ion concentration, sodium ion concentration and potassium ion concentration, and the invention is not limited thereto. On the other hand, the water concentrate disclosed by the invention has high mineral concentration, and should be diluted and then used for brewing beverages in practical application, which is particularly suitable for business customers, namely, practitioners who perform lots of brewing in such as coffee shops, tea shops or restaurants.

In order to further illustrate the specific technology and efficacy of the present invention, an experimental example prepared with the water concentrate according to the present invention is exemplified below in conjunction with a comparative example.

Organic acids such as malic acid, citric acid, lactic acid, and acetic acid, as well as components such as chlorogenic acid, quinic acid, and caffeine in coffee beans are important factors that determine coffee flavor, while the chlorogenic acid is also an important antioxidant in addition to affecting the flavor. In the following experimental examples, malic acid, citric acid, lactic acid, acetic acid, caffeine and total chlorogenic acid are examined as the indicators for verifying the present invention.

Experimental Example 1

In this experiment example, deep seawater was refined and concentrated to obtain a water concentrate. In other words, the mineral source of the water concentrate is the deep seawater. The water concentrate has a hardness of 70,890 ppm and includes a magnesium ion concentration of 14,105 ppm, a calcium ion concentration of 5,224 ppm, a sodium ion concentration of 467 ppm, and a potassium ion concentration of 477 ppm. 6 milliliters (ml) of the water concentrate comprising a bicarbonate ion concentration of 215 ppm and a pH of 7.28 is diluted with 5 liters (L) of RO water to obtain a brewing water. 150 milliliters (ml) of the brewing water is heated and then be used for brewing 10 grams (g) of light-roasted Guatemala coffee powder for 3 minutes to finally obtain a coffee beverage. The coffee beverage is analyzed by the high performance liquid chromatography (HPLC) to obtain the contents of malic acid, citric acid, lactic acid, acetic acid, total organic acid, chlorogenic acid, eugenol, caffeine and quinic acid, with the results as shown in Table 1.

Experimental Example 2

A brewing water used in this experimental example comprises the same specification as in Experimental Example 1, except that the brewing water is adjusted to have the same specification as in Experimental Example 1 by chemical additives. 150 milliliters (ml) of the brewing water is heated and then is used for brewing 10 grams (g) of light-roasted Guatemala coffee powder for 3 minutes to finally obtain a coffee beverage. The coffee beverage was analyzed by the high performance liquid chromatography (HPLC) to obtain the contents of malic acid, citric acid, lactic acid, acetic acid, total organic acid, chlorogenic acid, eugenol, caffeine and quinic acid, with the results as shown in Table 1.

Comparative Example 1

In this comparative example, 150 milliliters (ml) of RO water is heated and then is used to brew 10 grams (g) of light-roasted Guatemala coffee powder for 3 minutes to finally obtain a coffee beverage; and the coffee beverage was analyzed by the high performance liquid chromatography (HPLC) to obtain the contents of malic acid, citric acid, lactic acid, acetic acid, total organic acid, chlorogenic acid, eugenol, caffeine and quinic acid, with the results as shown in Table 1.

TABLE 1

|  | Experimental Example 1 | Experimental Example 2 | Comparative Example 1 |
| --- | --- | --- | --- |
| Malic acid (ppm) | 15,603 | 13,234 | 10,754 |
| Citric acid (ppm) | 9,409 | 5,248 | 6,774 |
| Lactic acid (ppm) | 18,327 | 7,119 | 11,997 |
| Acetic acid (ppm) | 2,163 | 952 | 1,509 |
| Total organic acid (ppm) | 45,501 | 26,553 | 31,035 |
| Chlorogenic acid (ppm) | 15,108 | 12,260 | 11,322 |
| Eugenol (ppm) | 62,477 | 36,308 | 34,767 |
| Caffeine (ppm) | 12,588 | 10,607 | 11,216 |
| Quinine acid (ppm) | 627,226 | 575,438 | 441,210 |

It can be seen clearly from the above experimental examples that the contents of malic acid, citric acid, lactic acid, acetic acid, total organic acid, chlorogenic acid, eugenol, caffeine and quinic acid of the coffee beverage brewed by the water concentrate according to the present invention are increased compared to the coffee beverage brewed by the conventional RO water.

In summary, the water concentrate provided by the invention has the advantages that the affinity to amino acids, flavonoid compounds, polyphenolic compounds, terpenoid compounds, alkaloids, and organic acids in coffee or tea beverages will be increased in a specific hardness and mineral range so as to improve extraction efficiency. The water concentrate increases the content of substances obviously which are helpful to the human body in addition to improving the taste and flavor of the beverages. In addition, chemical substances such as food additives, excipients and the like are not required to be additionally added to the beverage adjusted by the water concentrate, and the components are natural.

What is claimed is:

1. A water concentrate for brewing a beverage, comprising:
   a hardness in a range from 10,000 ppm to 100,000 ppm;
   a calcium ion concentration in a range from 300 ppm to 10,000 ppm;
   a magnesium ion concentration in a range from 200 ppm to 20,000 ppm;
   a sodium ion concentration in a range from 30 ppm to 1,000 ppm;
   a potassium ion concentration in a range from 30 ppm to 1,000 ppm;
   a bicarbonate ion concentration in a range from 10 ppm to 300 ppm; and
   a pH in a range from 6 to 9.

2. The water concentrate according to claim 1, wherein the hardness is in a range from 60,000 ppm to 80,000 ppm, the calcium ion concentration is in a range from 4,000 ppm to 6,000 ppm, the magnesium ion concentration is in a range from 13,000 ppm to 15,000 ppm, the sodium ion concentration is in a range from 400 ppm to 500 ppm, the potassium ion concentration is in a range from 400 ppm to 500 ppm, and the bicarbonate ion concentration is in a range from 200 ppm to 250 ppm.

3. The water concentrate according to claim 1, wherein the hardness is in a range from 10,000 ppm to 13,000 ppm, the calcium ion concentration is in a range from 1,000 ppm to 1,500 ppm, the magnesium ion concentration is in a range from 2,000 ppm to 2,500 ppm, the sodium ion concentration is in a range from 50 ppm to 100 ppm, the potassium ion concentration is in a range from 50 ppm to 100 ppm, and the bicarbonate ion concentration is in a range from 10 ppm to 100 ppm.

4. A beverage brewed by the water concentrate according to claim 1, comprising:
   at least one component selected from the group consisting of amino acids, flavonoid compounds, polyphenolic compounds, terpenoid compounds, alkaloids, organic acids, and a combination thereof.

5. The beverage according to claim 4, wherein the beverage is a coffee or a tea beverage.

6. A beverage brewed by the water concentrate according to claim 2, comprising:
   at least one component selected from the group consisting of amino acids, flavonoid compounds, polyphenolic compounds, terpenoid compounds, alkaloids, organic acids, and a combination thereof.

7. The beverage according to claim 6, wherein the beverage is a coffee or a tea beverage.

8. A beverage brewed by the water concentrate according to claim 3, comprising:
   at least one component selected from the group consisting of amino acids, flavonoid compounds, polyphenolic compounds, terpenoid compounds, alkaloids, organic acids, and a combination thereof.

9. The beverage according to claim 8, wherein the beverage is a coffee or a tea beverage.

10. A method for brewing a beverage, comprising the steps of:
    providing a water concentrate, wherein the water concentrate comprises a hardness in a range from 10,000 ppm to 100,000 ppm, a calcium ion concentration in a range from 300 ppm to 10,000 ppm, a magnesium ion concentration in a range from 200 ppm to 20,000 ppm, a sodium ion concentration in a range from 30 ppm to 1,000 ppm, a potassium ion concentration in a range from 30 ppm to 1,000 ppm, a bicarbonate ion in a range from 10 ppm to 300 ppm, and a pH in a range from 6 to 9;
    diluting the water concentrate with a water-based diluent to obtain a brewing water, wherein the volume ratio of the water concentrate to the diluent is in a range from 1:500 to 1:1500; and
    using the brewing water to brew a beverage material.

11. The method according to claim 10, wherein the hardness is in a range from 60,000 ppm to 80,000 ppm, the calcium ion concentration is in a range from 4,000 ppm to 6,000 ppm, the magnesium ion concentration is in a range from 13,000 ppm to 15,000 ppm, the sodium ion concentration is in a range from 400 ppm to 500 ppm, the potassium ion concentration is in a range from 400 ppm to 500 ppm, and the bicarbonate ion concentration is in a range from 200 ppm to 250 ppm.

12. The method according to claim 10, wherein the hardness is in a range from 10,000 ppm to 13,000 ppm, the calcium ion concentration is in a range from 1,000 ppm to 1,500 ppm, the magnesium ion concentration is in a range from 2,000 ppm to 2,500 ppm, the sodium ion concentration is in a range from 50 ppm to 100 ppm, the potassium ion concentration is in a range from 50 ppm to 100 ppm, and the bicarbonate ion concentration is in a range from 10 ppm to 100 ppm.

13. The method according to claim 10, wherein the beverage material contains at least one component selected from the group consisting of amino acids, flavonoid compounds, polyphenolic compounds, terpenoid compounds, alkaloids, organic acids, and a combination thereof.

14. The method according to claim 10, wherein the beverage material is a coffee or a tea.

* * * * *

UNITED STATES PATENT AND TRADEMARK OFFICE
CERTIFICATE OF CORRECTION

PATENT NO. : 11,224,231 B2  
APPLICATION NO. : 16/683905  
DATED : January 18, 2022  
INVENTOR(S) : Lin et al.

Page 1 of 1

It is certified that error appears in the above-identified patent and that said Letters Patent is hereby corrected as shown below:

On the Title Page

In item (73) Assignee:  
Change "Hsinchu Science Park (TW)" to --Miaoli County (TW)--

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*